United States Patent
Fu et al.

(10) Patent No.: US 11,122,329 B2
(45) Date of Patent: Sep. 14, 2021

(54) PREDICTING MULTIMEDIA SESSION MOS

(71) Applicant: Telefonaktiebolaget LM Ericsson (publ), Stockholm (SE)

(72) Inventors: Jing Fu, Solna (SE); Junaid Shaikh, Sundbyberg (SE); Tomas Lundberg, Luleå (SE); Gunnar Heikkilä, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/078,201

(22) PCT Filed: Feb. 22, 2017

(86) PCT No.: PCT/EP2017/054007
§ 371 (c)(1),
(2) Date: Aug. 21, 2018

(87) PCT Pub. No.: WO2017/144506
PCT Pub. Date: Aug. 31, 2017

(65) Prior Publication Data
US 2019/0052932 A1 Feb. 14, 2019

Related U.S. Application Data

(60) Provisional application No. 62/299,734, filed on Feb. 25, 2016.

(51) Int. Cl.
*G06F 15/173* (2006.01)
*H04N 21/442* (2011.01)
(Continued)

(52) U.S. Cl.
CPC ....... *H04N 21/44209* (2013.01); *H04L 65/80* (2013.01); *H04N 21/2402* (2013.01); *H04N 21/4392* (2013.01)

(58) Field of Classification Search
CPC ......... H04N 21/44209; H04N 21/2402; H04N 21/4392; H04L 65/80
(Continued)

(56) References Cited

U.S. PATENT DOCUMENTS

| 7,877,439 B2 * | 1/2011 | Gallou | H04L 29/06027 709/203 |
| 7,877,525 B1 * | 1/2011 | Sun | H04L 67/14 710/29 |

(Continued)

OTHER PUBLICATIONS

Series P. Telephone Transmission Quality, Telephone Installations, Local Line Networks, ITU-T Draft; Study Period 2013-2016, International Telecommunication Union, Geneva; CH, Dec. 13, 2016 (Nov. 13, 2015), pp. 1-22.*

(Continued)

*Primary Examiner* — Atta Khan
(74) *Attorney, Agent, or Firm* — Withrow & Terranova, PLLC (57) ABSTRACT

It is provided a method, performed by a MOS, Mean Opinion Score, estimator, for predicting a multimedia session MOS. The multimedia comprises a video and an audio, wherein video quality is represented by a list of per time unit scores of a video quality, an initial buffering event and rebuffering events in the video, and wherein audio quality is represented by a list of per time unit scores of audio quality. The method comprises: generating video features from the list of per time unit scores of the video quality; generating audio features from the list of per time unit scores of the audio quality; generating buffering features from the initial buffering event and rebuffering events in the video; and estimating a multimedia session MOS from the generated video features, generated audio features and generated buffering features by using machine learning technique.

21 Claims, 6 Drawing Sheets

(51) Int. Cl.
  *H04L 29/06* (2006.01)
  *H04N 21/24* (2011.01)
  *H04N 21/439* (2011.01)
(58) Field of Classification Search
  USPC .......................................................... 709/224
  See application file for complete search history.

(56) References Cited

U.S. PATENT DOCUMENTS

| | | | | |
|---|---|---|---|---|
| 7,913,282 | B2* | 3/2011 | Ishikawa | H04N 21/64322 725/87 |
| 8,239,911 | B1* | 8/2012 | Sun | H04N 21/41422 725/118 |
| 8,792,439 | B2* | 7/2014 | Kahn | H04W 28/22 370/329 |
| 8,850,054 | B2* | 9/2014 | Burckart | G06F 15/16 709/231 |
| 2010/0040016 | A1* | 2/2010 | Lor | H04W 12/062 370/331 |
| 2010/0172329 | A1* | 7/2010 | Yokoyama | H04W 36/30 370/332 |
| 2011/0093605 | A1* | 4/2011 | Choudhury | H04L 67/22 709/231 |
| 2011/0317631 | A1* | 12/2011 | Navda | H04W 72/1231 370/329 |
| 2012/0007733 | A1* | 1/2012 | Cho | H04W 52/0261 340/539.3 |
| 2012/0009890 | A1* | 1/2012 | Curcio | H04L 1/0002 455/230 |
| 2012/0317432 | A1* | 12/2012 | Assad | G06F 1/325 713/340 |
| 2013/0194434 | A1* | 8/2013 | Krishnakumar | H04N 7/148 348/192 |
| 2014/0013375 | A1* | 1/2014 | Giladi | H04L 67/02 725/112 |
| 2014/0095597 | A1* | 4/2014 | McNeil | G06Q 50/01 709/204 |
| 2015/0142702 | A1* | 5/2015 | Nilsson | H04M 3/2227 706/11 |

OTHER PUBLICATIONS

Consultation by Telephone for European Patent Application No. 17708715.2, mailed Oct. 2, 2019, 8 pages.
Author Unknown, "Series G: Transmission Systems and Media, Digital Systems and Networks: Multimedia Quality of Service and performance—Generic and user-related aspects: Opinion model for network planning of video and audio streaming applications," Telecommunication Standardization Sector of ITU (ITU-T), Recommendation ITU-T G.1071, Jun. 2015, International Telecommunication Union, 36 pages.
Author Unknown, "Series G: Transmission Systems and Media, Digital Systems and Networks: Multimedia Quality of Service and performance—Generic and user-related aspects: Opinion model for network planning of video and audio streaming applications," Telecommunication Standardization Sector of ITU (ITU-T), Recommendation ITU-T G.1071, Nov. 2016, International Telecommunication Union, 40 pages.
Author Unknown, "Series P: Terminals and Subjective and Objective Assessment Methods: Models and tools for quality assessment of streamed media: Parametric non-instrusive assessment of audiovisual media streaming quality," Telecommunication Standardization Sector of ITU (ITU-T), Recommendation ITU-T P.1201, Oct. 2012, International Telecommunication Union, 32 pages.
Author Unknown, "Series P: Terminals and Subjective and Objective Assessment Methods: Models and tools for quality assessment of streamed media: Parametric non-intrusive assessment of audiovisual media streaming quality: Amendment 2: New Appendix II—Use of ITU-T P.1201 for non-adaptive, progressive download type media streaming," Telecommunication Standardization Sector of ITU (ITU-T), Recommendation ITU-T P.1201, Amendment 2, Dec. 2013, International Telecommunication Union, 28 pages.
Author Unknown, "Series P: Terminals and Subjective and Objective Assessment Methods: Models and tools for quality assessment of streamed media: Parametric non-intrusive bitstream assessment of video media streaming quality," Telecommunication Standardization Sector of ITU (ITU-T), Recommendation ITU-T P.1202, Oct. 2012, International Telecommunication Union, 26 pages.
Author Unknown, "Series P: Telephone Transmission Quality, Telephone Installations, Local Line Networks: Models and tools for quality assessment of streamed media: Parametric bitstream-based quality assessment of progressive download and adaptive audiovisual streaming services over reliable transport—Quality integration module," Telecommunication Standardization Sector of ITU (ITU-T), Recommendation ITU-T P.1203.3, Oct. 2017, International Telecommunication Union, 20 pages.
Aloman, A. et al., "Performance evaluation of video streaming using MPEG DASH, RTSP, and RTMP in mobile networks," Proceedings of the 8ths IFIP Wireless and Mobile Networking Conference (WMNC), Munich, 2015, pp. 144-151.
Samet, Nouha, et al., "Real-time User Experience evaluation for Cloud-based Mobile Video," Proceedings of the 30th International Conference on Advanced Information Networking and Applications Workshops (WAINA), Crans-Montana, 2016, pp. 204-208.
Schatz, Raimund et al., "Passive YouTube QoE Monitoring for ISPs," Proceedings of the 6th International Conference on Innovative Mobile and Internet Services in Ubiquitous Computing, Palermo, 2012, pp. 358-364.
International Search Report and Written Opinion for International Patent Application No. PCT/EP2017/054007, dated May 23, 2017, 13 pages.

* cited by examiner

PREDICTING MULTIMEDIA SESSION MOS

This application is a 35 U.S.C. § 371 national phase filing of International Application No. PCT/EP2017/054007, filed Feb. 22, 2017, which claims the benefit of U.S. Provisional Application No. 62/299,734, filed Feb. 25, 2016, the disclosures of which are incorporated herein by reference in their entireties.

TECHNICAL FIELD

The invention relates to a method, MOS estimators, a computer program and a computer program product for predicting multimedia session MOS (Mean Opinion Score).

BACKGROUND

Mean Opinion Score (MOS) is a measure of subjective opinion of users about a service or application performance. It has been widely used to evaluate the quality of multimedia applications. The ITU-T recommendation P. 800 has standardised the use of MOS on a 5-point Absolute Category Rating (ACR) scale for evaluation of the audio-visual test sequences. The ACR scale ranges from 5 (Excellent) to 1 (Bad). This method is particularly relevant in scenarios where a user is presented with one test sequence at a time and then asked to rate it.

Objective MOS estimation refers to the approximation of subjective quality of service or application using mathematical models. These models require a set of measurable metrics or Key Performance Indicators (KPIs), which are then modelled against the subjective ratings given by the users. The models are then implemented in production environment to assess the quality.

In the past, several models have been proposed and standardised for the assessment of multimedia streaming quality. The usage of these models varies depending on the availability of information about stream, desired usage and computational complexity.

There are three test methods based on which the models are developed.

First, a full-reference method, which takes into account the information about media stream at the source and the receiver ends. The information/metrics are retrieved before the encoding of stream at the sender end, and compared with the information/metrics of the same decoded stream retrieved at the receiver end. These metrics are based on the pixel-based information of video streams.

Second, a reduced-reference method, which does not rely on all the information of original stream but may operate on only a part of information about the original stream. For example, it estimates the amount of distortion in the received video without comparing it pixel-by-pixel with the original video at the sender end.

Third, a No-Reference (NR) method, in which context some models use pixel-based metrics from a decoded video stream to estimate MOS, and others simply rely on metrics extracted from transport stream on network (using header and payload information of packet). This estimation is done without having any knowledge of the original stream at the sender end.

ITU-T (International Telecommunication Union-Telecommunication Standardisation Sector) is a main forum for standardisation of media quality models, and during the years a number of such standardised models have been developed. ITU-T Study Group 12 is an expert group responsible for the development of international standards (ITU-T Recommendations) on performance, quality of service (QoS) and quality of experience (QoE). In Question 14 of ITU-T Study Group 12, development of parametric models and tools for multimedia quality assessment is done. A number of recommendations have been issued the last years.

For instance, both algorithms which rely only on simple parameters to estimate the quality of a video stream, as well as slightly more complex parameters have been standardised. Both of these, however, are restricted to transmission over the RTP (Real Time Protocol) protocol, while the dominant delivery protocol today is HTTP (Hypertext Transfer Protocol).

A later amendment by ITU-T describes how the standard can be used also for a more typical HTTP delivery case. However, the presented quality assessment is still rudimentary and is not sufficient for the complicated delivery of multimedia over HTTP which occur in reality today.

SUMMARY

It is an object to improve how Mean Opinion Scores are estimated.

According to a first aspect, it is provided a method, performed by a MOS, Mean Opinion Score, estimator, for predicting a multimedia session MOS. The multimedia comprises a video and an audio (i.e. a video stream and an audio stream), wherein video quality is represented by a list of per time unit scores of a video quality, an initial buffering event and rebuffering events in the video, and wherein audio quality is represented by a list of per time unit scores of audio quality. The method comprises: generating video features from the list of per time unit scores of the video quality; generating audio features from the list of per time unit scores of the audio quality; generating buffering features from the initial buffering event and rebuffering events in the video; and estimating a multimedia session MOS from the generated video features, generated audio features and generated buffering features by using machine learning technique.

The video features may comprise a feature being a first percentile of the per unit time scores of the video quality.

The video features may comprise a feature being a fifth percentile of the per unit time scores of the video quality.

The video features may comprise a feature being a fifteenth percentile of the per unit time scores of the video quality.

The step of estimating may be based on a random forest based model.

The buffering features may comprise a feature being total buffering time.

The buffering features may comprise a feature being number of rebuffering events.

The buffering features may comprise a feature being percentage of buffering time divided by video time.

The buffering features may comprise a feature being number of rebuffering events per video length.

The buffering features may comprise a feature being last seen rebuffering from the end of the video.

According to a second aspect, it is provided a MOS, Mean Opinion Score, estimator for predicting a multimedia session MOS. The multimedia comprises a video and an audio, wherein video quality is represented by a list of per time unit scores of a video quality and an initial buffering event and rebuffering events in the video and wherein audio quality is represented by a list of per time unit scores of audio quality. The MOS estimator comprises processing means and a memory comprising instructions which, when executed by the processing means, causes the MOS estimator to: generate video features from the input list of per time unit scores of the video quality; generate audio features from the input list of per time unit scores of the audio quality; generate buffering features from the initial buffering event and rebuffering events in the video; and estimate a multimedia session MOS from the generated video features, generated audio features and generated buffering features by using machine learning technique.

The video features may comprise a feature being a first percentile of the per unit time scores of the video quality.

The video features may comprise a feature being a fifth percentile of the per unit time scores of the video quality.

The video features may comprise a feature being a fifteenth percentile of the per unit time scores of the video quality.

The instructions to estimate may comprise instructions which, when executed by the processing means, causes the MOS estimator to estimate using a random forest based model.

The buffering features may comprise a feature being total buffering time.

The buffering features may comprise a feature being number of rebuffering events.

The buffering features may comprise a feature being percentage of buffering time divided by video time.

The buffering features may comprise a feature being number of rebuffering events per video length.

The buffering features may comprise a feature being last seen rebuffering from the end of the video.

According to a third aspect, it is provided a MOS, Mean Opinion Score, estimator comprising: a generating module, configured to generate video features from the input list of per time unit scores of the video quality, generate audio features from the input list of per time unit scores of the audio quality and generate buffering features from the initial buffering event and rebuffering events in the video; and a predicting module, configured to predict a multimedia session MOS from the generated video features, generated audio features and generated buffering features by using machine learning technique.

According to a fourth aspect, it is provided a computer program for a MOS, Mean Opinion Score, estimator, comprising a computer program code which, when executed, causes the MOS estimator to: generate video features from the input list of per time unit scores of the video quality; generate audio features from the input list of per time unit scores of the audio quality; generate buffering features from the initial buffering event and rebuffering events in the video; estimate a multimedia session MOS from the generated video features, generated audio features and generated buffering features by using machine learning technique.

According to a fifth aspect, it is provided a computer program product for a MOS estimator comprising a computer program for a MOS estimator according to the fourth aspect and a computer readable means on which the computer program for a MOS estimator is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The subjective MOS is how humans rate the quality of a multimedia sequence. Objective MOS estimation is using models to predict/estimate how humans will rate it. In general, parametric based methods are usually used to predict the multimedia MOS. This kind of parametric based methods usually results in quite a large prediction error.

The basic idea of embodiments presented herein is to predict the multimedia session MOS using machine learning approaches. The input for the prediction includes the following:

1. A list of per time unit scores of the video quality
2. A list of per time unit scores of the audio quality
3. The initial buffering event and rebuffering events in the video.

A time unit may be a second. Thus, the lists of per time unit scores of the video and audio quality may be obtained per second.

From these inputs, a number of features are generated. Next, using these features, a machine learning model is trained with random forest to predict session MOS. Each feature is such that a Boolean condition can be obtained by evaluating the feature according to some criteria, e.g. comparing a scalar feature with a certain value.

Figure 1:
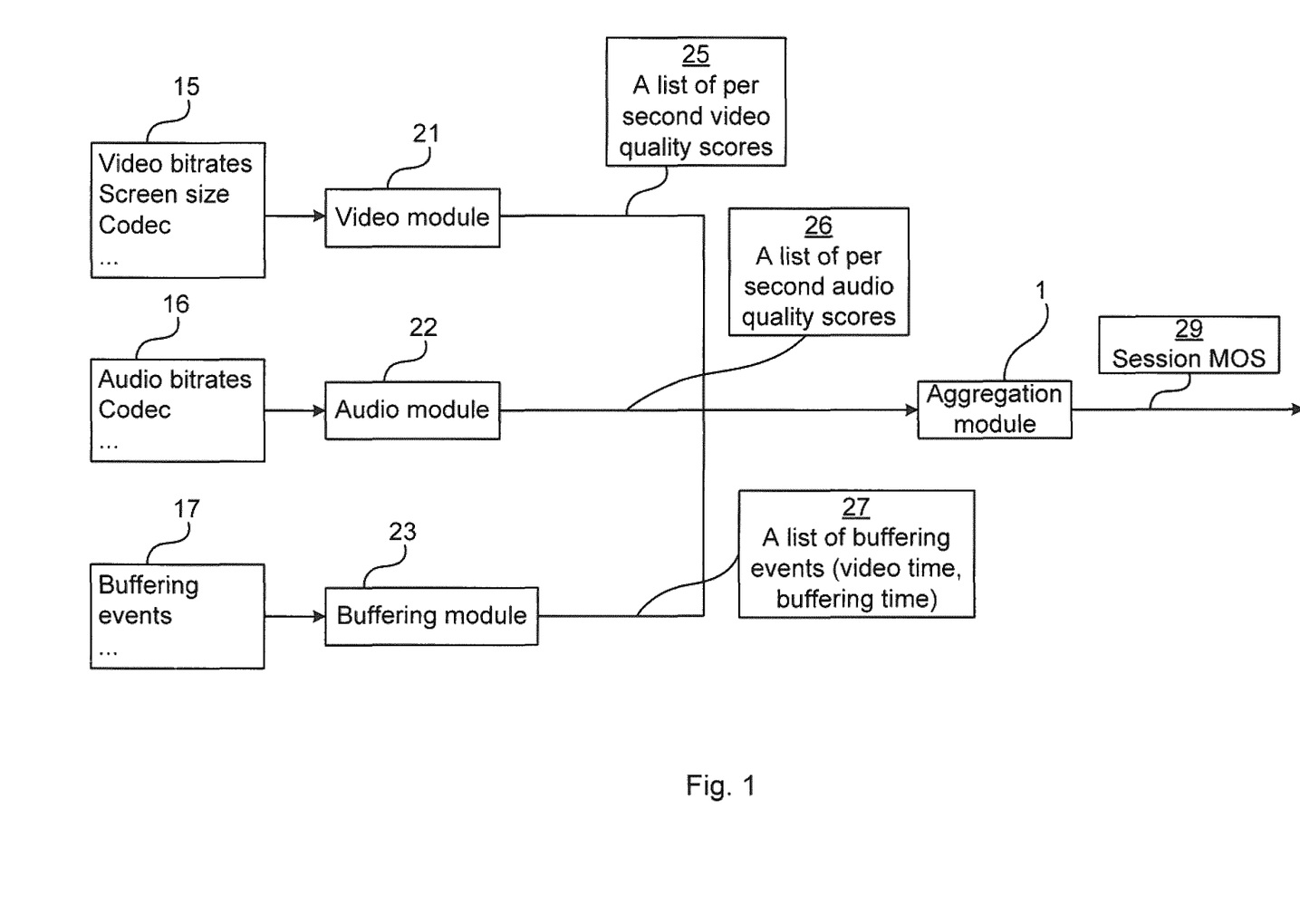
FIG. 1 illustrates a system architecture according to the embodiments presented herein.

FIG. 1 illustrates the system architecture according to the embodiments presented herein. FIG. 1 relate to a receiver (see 13 of FIG. 7) of a multimedia session. We have a video module 21 to predict the per time unit (e.g. second) second scores of the video quality of a video sequence. The input 15 to this video module 21 includes video bitrates, codecs, screen size, frame types, etc. The output 25 of this video module 21 is a list of scores for video quality, with each element representing the quality for one second. For instance, the video output 25 includes a series of video scores such as [3.1, 3.2, 3.3, 3.3, 3.5, . . . ].

We also have an audio quality module 22 to predict the per time unit (e.g., second) scores of the audio quality of a video sequence. The input 16 to this audio module 22 includes audio bitrates, audio codecs, etc. The output 26 is also a list of scores, but for audio quality. For instance, the audio output 26 includes a series of audio scores such as [2.1, 2.2, 3.3, 3.3, 3.5, . . . ].

Also, there is a buffering module 23 to provide statistics of the buffering during this video playout. The input 17 to the buffering module is buffering events 17. The output 27 of the buffering module 23 contains a list of buffering events, where each event includes the time since start of video clip, and the duration of buffering. For instance, the buffer output 27 includes a series of buffering events such as [[0, 2], [10, 1]], in where the first parameter of each event is the video time (i.e. a timestamp in a media timeline) at which point the buffering started and the latter is called buffering time (i.e. duration of the buffering). If the video time is 0, it is called the initial buffering. Otherwise, it is considered as the rebuffering.

The video input 15, the audio input 16 and the buffering input 17 all relate to one multimedia session, i.e. a single reception of multimedia comprising both video and audio.

An aggregation module 1, takes the outputs 21, 22, 23 from the video module 21, audio module 22, and buffering module 23 to predict the final session MOS score 29. The aggregation module 1 is also referred to as a MOS estimator herein.

Figure 2A:
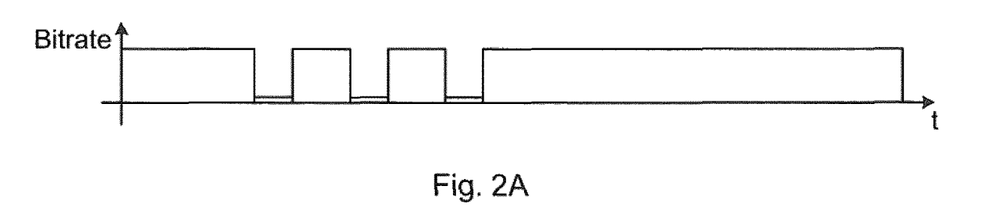
FIGS. 2A-C are schematic graphs illustrating buffering and bitrate over time.
Figure 2B:
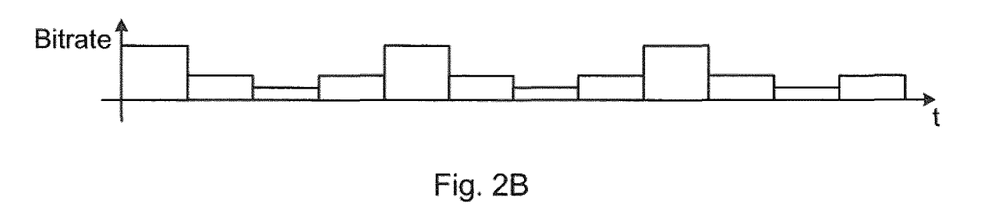
Figure 2C:
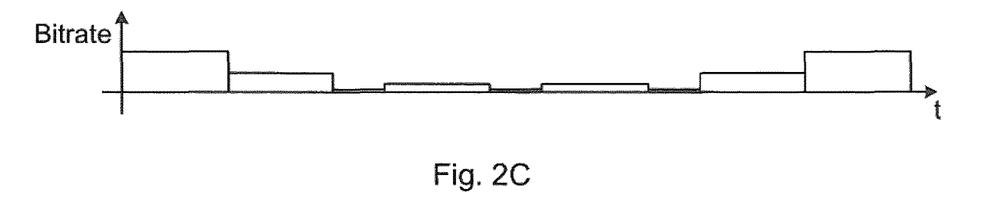

FIGS. 2A-C are schematic graphs illustrating buffering. Time progresses along the horizontal axis. The vertical axis represents bitrate.

Figure 7:
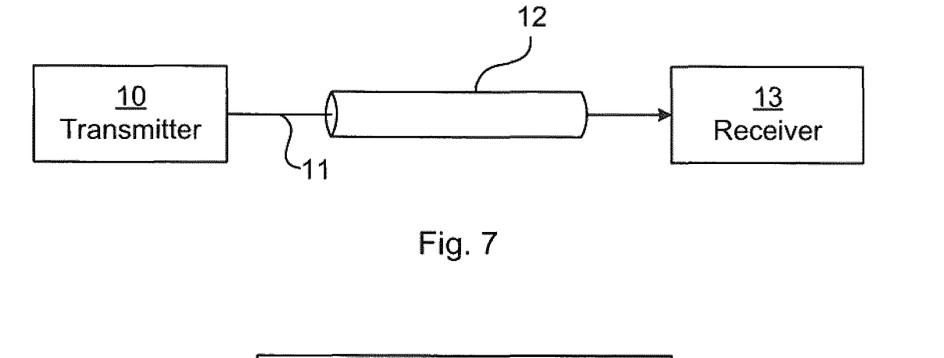
FIG. 7 is a schematic diagram illustrating the relationship between transmitter and receiver.

One impact in quality is rebuffering (when the transmission speed is not high enough), as seen in FIG. 2A. This can also be referred to as stalling. There are there three gaps (with zero bitrate) which represents rebuffering.

When the transmission capacity in a network fluctuates, for instance for a wireless connection, the media player (in the receiver, 13 of FIG. 7) can often select to adapt the bitrate, so that the video can still be delivered, albeit with sometimes worse quality (lower bitrate, lower resolution etc.). FIG. 2B illustrates an example for a 60-second video, where the height represents the bitrate, and each block is 5 seconds long. The quality models of the prior art do not account for this adaptation of bitrate.

Note that also in the case of adaptive bitrate, rebufferings may occur, so the combinations of adaptations and rebufferings need to be handled, as in the more complex example of FIG. 2C.

Figure 3:
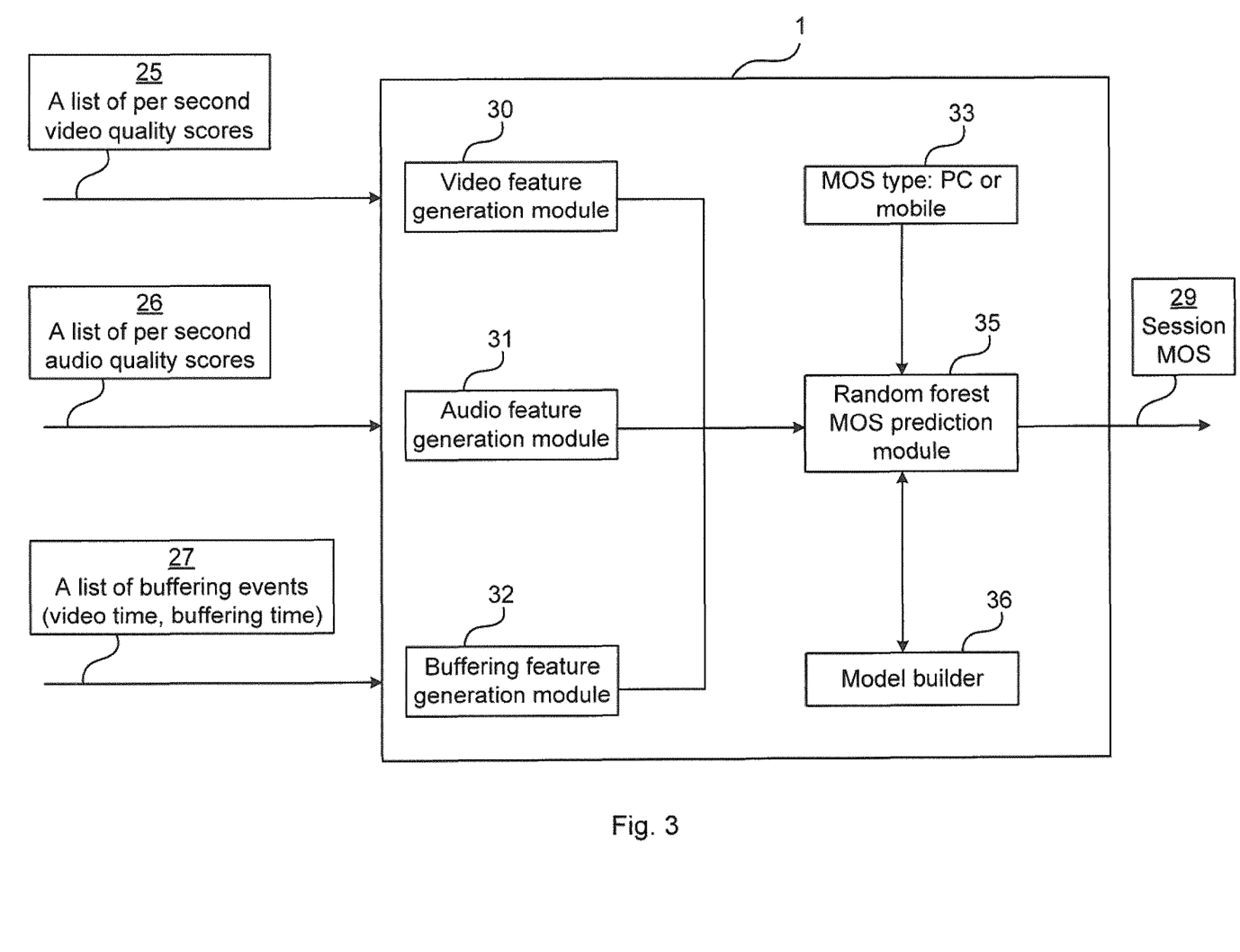
FIG. 3 shows the aggregation module of FIG. 1 according to embodiments presented herein.

FIG. 3 shows the aggregation module 1 of FIG. 1 according to embodiments presented herein.

The aggregation module 1 here uses an objective model for estimation of multimedia streaming quality, belonging to the No-Reference context.

The aggregation module 1 contains several sub-modules. First, there is a video feature generation module 30. Second, there is an audio feature generation module 31. Third, there is a buffering feature generation module 32. Finally, there is a random forest prediction module 35 together with model builder 36.

The video feature generation module 30 generates features from the list of per time unit video scores 25 (obtained from the video module 21 of FIG. 1).

The time unit can be any suitable time unit. For example, a time unit may be a second. There are seven features that are significant for video MOS prediction. Hence, the output of the video feature generation module 30 contains one or more of the following 7 features:
1. Video length (the length of the media)
2. $1^{st}$ percentile of the per second video score
3. $5^{th}$ percentile of the per second video score
4. $15^{th}$ percentile of the per second video score
5. Average of the first part (the first ⅓ of the video) of the per second video score
6. Average of the middle part (the second ⅓ of the video) of the per second video score
7. Average of the last part (the final ⅓ of the video) of the per second video score However, the embodiments presented herein is by no means limited to the seven features identified above, nor to the exact numerical values given above.

The audio feature generation module 31 is used to generate features from the list of per second audio scores 26 (obtained from the audio module 22 of FIG. 1). It has been found empirically that audio quality is less important for MOS prediction than video quality. Therefore, it is here presented two features which may be used to capture audio quality. The two features are:
1. Average of the first part (first ½ of the audio) of the per second audio score
2. Average of the second part (second ½ of the audio) of the per second audio score.

The buffering feature generation module 32 is used to generate features based on buffering events. The input is the list of buffering events 27 (obtained from the buffering module 23 of FIG. 1), where each event includes a video time, and a buffering time. The video time shows how much (when) in the video playout the buffering started, and the buffering time shows how much time of buffering it is. It is to be noted that the video time does not include the length of any possible previous bufferings. If the video time is 0, it means the buffering is initially buffering. Otherwise it is more considered as rebuffering. In other words, the initial buffering (at video time 0) is not a rebuffering but all subsequent bufferings (at video times after 0) are considered rebuffering.

An example of a list of buffering is shown below. This example comprises three buffering events, one at the beginning of the video with 3 seconds of buffering, one in 10 seconds of the video with 2 seconds of rebuffering, and one in 50 seconds of the video with 1 second of rebuffering.

The buffering event input 27 are then represented by: [[0, 3], [10, 2], [50, 1]]

One or more of the following features can be generated according to embodiments herein:
1. Total buffering time (With some adjustment for initial buffering)
2. Number of rebuffering events
3. Percentage of buffering time divided by video time
4. Number of rebuffering events per video length
5. Last seen rebuffering from the end of the video However, the embodiments presented herein are not limited to the five features above—there may be more features used in this module.

The total buffering time sums up the seconds of buffering in the video playout. However, the initial buffering event is given $⅓^{rd}$ of weight compared to other rebuffering events as users tend to forget about the events occurring at the start of streaming due to the effect of memory. Also, our data driven approach shows that this approach provides higher prediction accuracy. With this approach, the total buffering time is 3/3+2+1=4 on the sample above.

The number of rebuffering events is the count of all the rebuffering events. In the above example, number of rebuffering events is two. The initial buffering is not considered a rebuffering event.

The third feature percentage of buffering time compared to video time is calculated by taking the value of feature 1 divided by the total video length. This can also be thought of as a radio of stalling duration. As the test set of video sequences of different length, using this feature is also good. The value of feature 3 in the above example becomes 4/60=0.067 if the media length is 60 seconds long.

The fourth feature, i.e., the number of rebuffering events per video length is to take feature 2 divided by video length. The value for the example is then 2/60=0.033. This can also be thought of a frequency of rebuffering events.

Finally, there is a feature about last seen rebuffering. In the example, the video length is 60 seconds, while the (start of the) last rebuffering is done at 50 seconds, so the last seen rebuffering from the end of the video is 60−50=10 seconds. If there is no rebuffering in the session, the last seen rebuffering is set to the media length.

A random forest MOS prediction module 35 takes in inputs (features) from the video feature generation module 30, audio feature generation module 31 and the buffering feature generation module 32. In the case when the inputs from the modules are as described above, there is a total of fifteen inputs (i.e. features): the seven inputs are from the video feature generation module 30, two inputs are from the audio feature generation module 31 and five inputs are from the buffering feature generation module 32. Finally (and optionally), one more feature about the device type 33, which indicates if the test is on a mobile device or PC device is given as input to the model in the random forest MOS prediction module 35. The output 39 of the random forest MOS prediction module 35 is an estimated (or predicted) MOS value.

Figure 4:
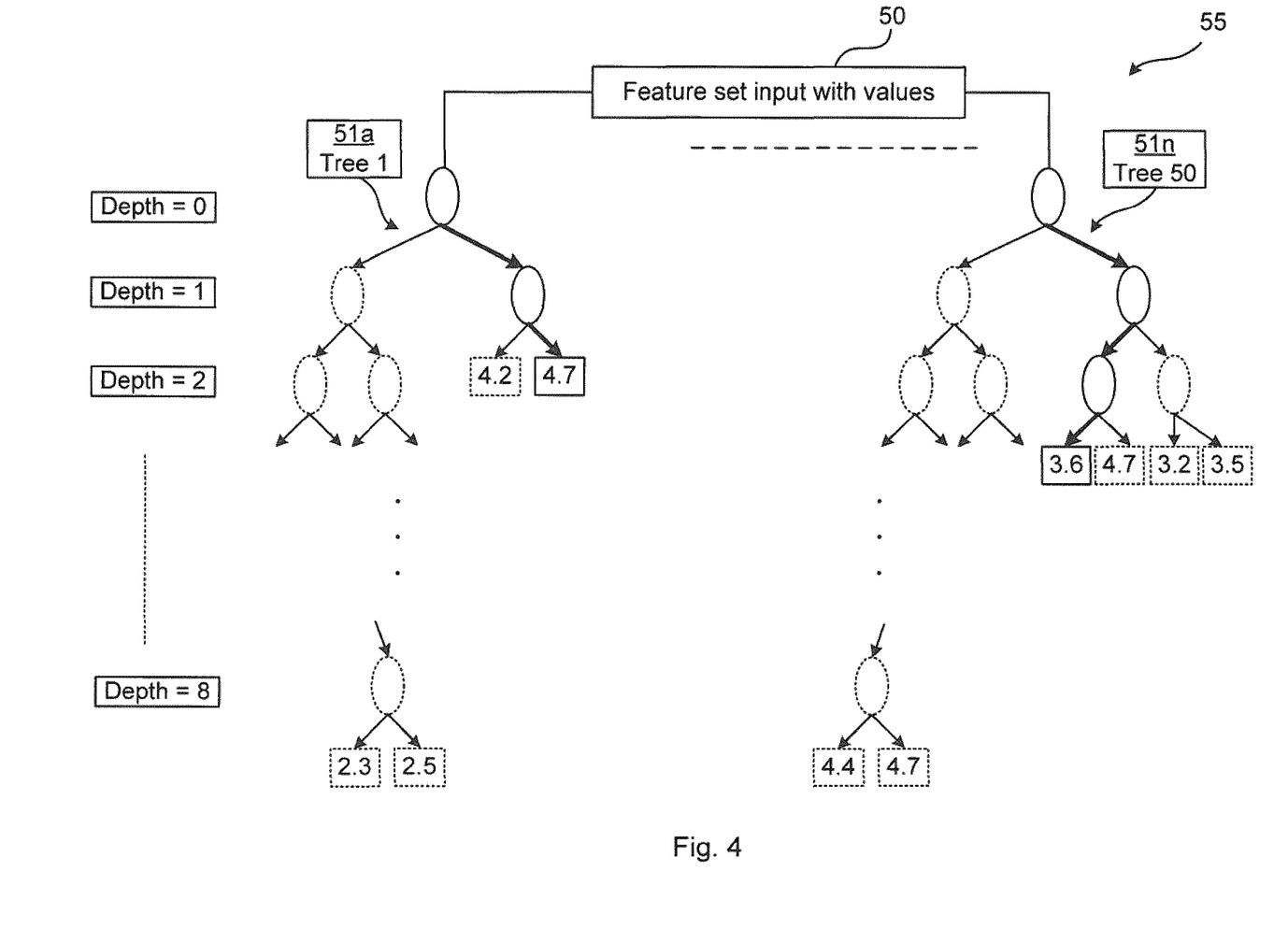
FIG. 4 depicts a random forest model according to one scenario which can be applied in embodiments presented herein.

FIG. 4 depicts a random forest model 55 according to one scenario. The random forest model is applied in the random forest MOS prediction module 35 of FIG. 3. It is to be noted that other random forest models with different number of trees and/or depths can be applied. The input to the model 55 is a feature set input with values 50, i.e. one or more of the features described above.

The random forest based model 55 may be built on a number of trees, each tree characterised with a maximum depth. For a model according to one scenario, the random forest is built on fifty trees. Each tree has a maximum depth of eight, which means that hierarchically there can be only eight levels in the trees. The depth is set to eight, which provides a good trade-off between accuracy and complexity of model. Upon receiving inputs from video, audio and buffering modules for a particular streaming session, it estimates MOS in the following way.

The model 55 parses through fifty trees 51a-n that were already constructed during a training phase of the model 55. At each node in a tree, there is a condition check on the value of a certain feature (for example, among the fifteen features described above) is smaller than the specified value of the tree node, if the answer to the condition is YES, it proceeds to the left child node. Otherwise, it proceeds to the right child node. It recursively goes through all the levels in a tree, until it reaches a leaf node of the tree, where it gets a MOS estimate. The leaf node can be reached at any depth between one and eight, depending on trees and the values of feature.

The above process is performed for all the fifty trees, which can be done in parallel for all the trees. Finally, there are fifty estimates of MOS scores for the streaming session obtained from the corresponding fifty trees. The average of the fifty MOS scores is then calculated. Henceforth, the module gives an output (29 of FIG. 3) in the form of average MOS score, which is the final estimate of MOS score for the considered streaming session.

An example of the random forest model 55 with fifty trees and maximum depth of eight is shown in FIG. 4. The nodes in trees are ovals and leaves are depicted as rectangles. With a given input of feature values to the aggregation module, in the first tree 51a, the leaf node is reached at depth 2 with an output MOS estimate of 4.7 (the leaf being indicated with a solid line bordered rectangle). Similarly, in tree fifty, the MOS estimate for this example is 3.6, which is reached at depth 3 (the leaf being indicated with a solid line bordered rectangle). The paths to leaves in the above examples are shown by thick lined arrows.

The model in the embodiments presented herein may optionally be extended by introducing any one or more several other features, some of which are listed here:

1. Mean play duration: the play duration ($t_p$) is the time interval in which a user enjoys smooth playout of multimedia streaming without any rebufferings. It can also be defined as the time duration between two subsequent rebuffering events and thus expressed as:

$$t_p = T_r^{i+1} - T_r^i$$

where $T_r^i$ is the time when rebuffering event i occurs. Thus, mean play duration ($\bar{t}_p$) is the mean of all the episodes of smooth playouts occurring within a stream.

2. Mean rebuffering duration: the mean rebuffering duration ($\bar{t}_r$) is the mean length of all the individual rebuffering events occurring within a streaming session.

3. Rebuffering frequency: the rebuffering frequency ($f_r$) is a measure of repetition of rebuffering events within a streaming session. It can be expressed by:

$$f_r = \frac{1}{\bar{t}_p}$$

4. Mean cycle duration: The mean cycle duration ($\bar{t}_c$) is the sum of mean play and rebuffering durations within a streaming session and can be expressed by:

$$\bar{t}_c = \bar{t}_p + \bar{t}_r$$

5. Rebuffering duration difference between the first and the last half of to streaming:

Assuming that the amount of impact of total rebuffering duration in the first and the last half of a session differs due to the user memory, a feature based on the difference between rebuffering durations of the first and the last half of streaming session is proposed. The durations of all rebuffering events occurring within each half are added. The difference is then taken by subtracting the sum of duration of rebufferings of first half from the last half. For example, if the total duration of all the rebuffering events occurring within the first 50% and the last 50% parts of a video streaming session is 10 seconds and 15 seconds, respectively, the value of this feature will become 5 seconds.

6. Rebuffering count difference between the first and the last half:

Like the above feature, this feature is the difference between counts of rebufferings occurring within first and last half of streaming session.

7. Standard deviation of per-second audio MOS scores: the standard deviation of all the per-second audio MOS scores given by the audio module is calculated.
8. Minimum per-second video MOS score: the minimum per-second score input from video module within a streaming session.
9. Maximum per-second video MOS score: the maximum per-second score from video module within a streaming session.
10. Number of per-second video MOS degradations: the number of degradations recorded in per-second MOS values over time within a streaming session. Each degradation refers to a drop in per-second video MOS value as compared to the previous video MOS value.
11. Per-second change in video MOS scores: the list of per-second MOS scores are collected from the video module. The difference between every two subsequent per-second video MOS values is calculated. These differences are squared and then their sum is taken, which refers to the per-second change in video MOS scores. The following equation expresses this feature:

$$\mu = \Sigma_i^n (vMOS_{i+1} - vMOS_i)^2$$

where $vMOS_i$ is the video MOS score of the $i^{th}$ second of a streaming session.

Figure 5:
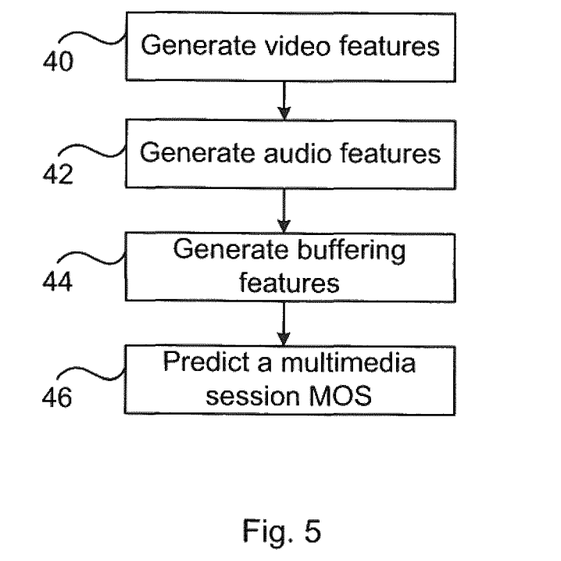
FIG. 5 illustrates the steps performed by a MOS estimator according to the embodiments presented herein.

FIG. 5 is a flow chart illustrating the steps performed by a MOS estimator according to embodiments presented herein. The method is performed for predicting a multimedia session MOS, wherein the multimedia comprises a video and an audio, i.e. a video stream and an audio stream. As explained above, video quality is represented by a list of per time unit scores of a video quality, an initial buffering event and rebuffering events in the video. Also, audio quality is represented by a list of per time unit scores of audio quality.

In a generate video features step 40, video features are generated from the list of per time unit scores of the video quality. The video features may comprise a feature being a first percentile of the per unit time scores of the video quality. The video features may comprise a feature being a fifth percentile of the per unit time scores of the video quality. The video features may comprise a feature being a fifteenth percentile of the per unit time scores of the video quality.

In a generate audio features step 42, audio features are generated from the list of per time unit scores of the audio quality.

In a generate buffering features step 44, buffering features are generated from the initial buffering event and rebuffering events in the video. The buffering features may comprise a feature being total buffering time. The buffering features may comprise a feature being number of rebuffering events. The buffering features may comprise a feature being percentage of buffering time divided by video time. The buffering features may comprise a feature being number of rebuffering events per video length. The buffering features may comprise a feature being last seen rebuffering from the end of the video.

In a predict a multimedia session MOS step 46, a multimedia session MOS (39 of FIG. 3) is estimated from the generated video features, generated audio features and generated buffering features by using machine learning technique. In one embodiment, the estimating is based on a random forest based model.

Figure 6:
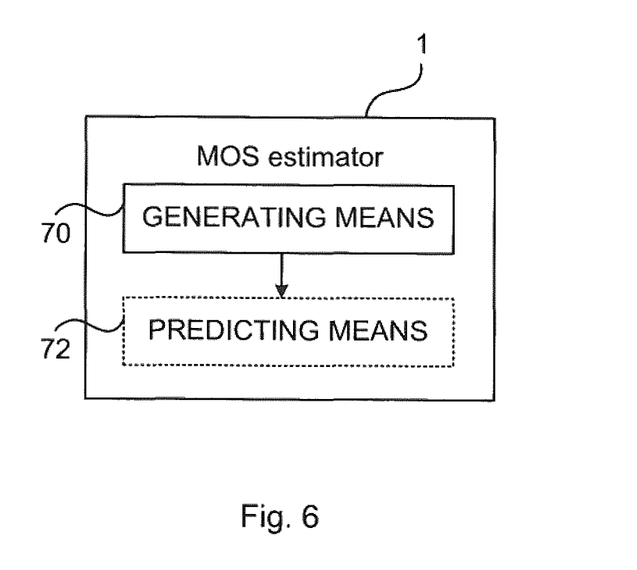
FIG. 6 illustrates a MOS estimator according to the embodiments presented herein.

FIG. 6 illustrates a MOS estimator according to the embodiments presented herein, wherein the MOS estimator comprises functional modules. The modules are implemented using software instructions such as a computer program executing in the MOS estimator. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 5.

A generating means 70 corresponds to steps 40, 42 and 44. A predicting means 72 corresponds to step 46.

FIG. 7 is a schematic diagram illustrating the relationship between transmitter and receiver. A transmitter 10 transmits multimedia 11 comprising video and audio, over a channel 12, to the receiver 13. The channel 12 can be based on wireless communication and/or wire-based communication. As explained above, the channel 12 is not perfect (e.g. due to interference, congestion, fading, etc.). Hence, the quality experienced at the receiver 13 can vary and can be expressed by MOS.

Figure 8:
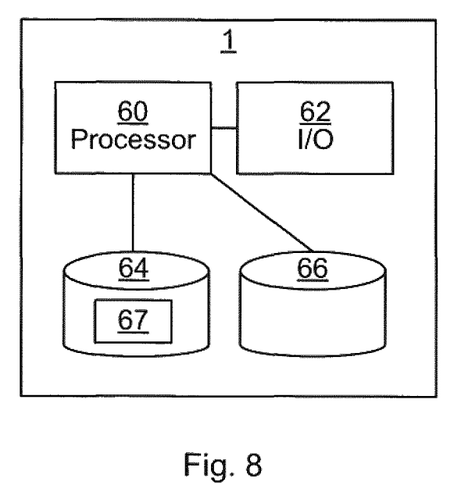
FIG. 8 is a schematic diagram illustrating components of the MOS estimator of FIG. 2.

FIG. 8 is a schematic diagram illustrating components of the MOS estimator 1 of FIG. 3. The components can be shared with a host device hosting the MOS estimator. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 5 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The MOS estimator further comprises an I/O interface 62 for communicating with other external entities. Optionally, the I/O interface 62 also includes a user interface.

Other components of the MOS estimator are omitted in order not to obscure the concepts presented herein.

Figure 9:
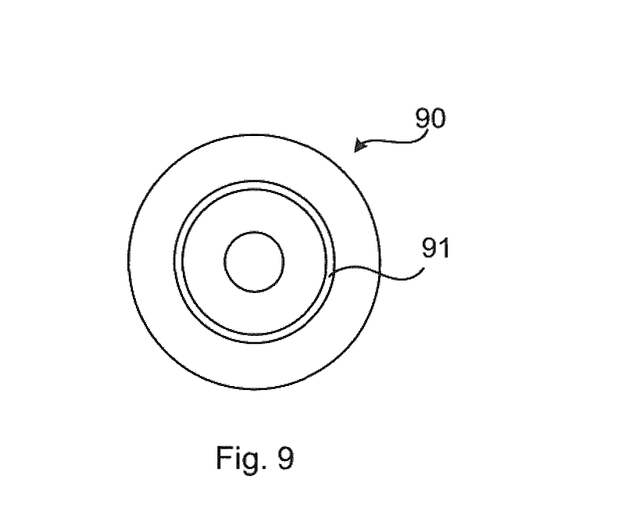
FIG. 9 shows one example of a computer program product comprising computer readable means.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 8. While the computer program 91 is here schematically shown as a track on the to depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed by a MOS, Mean Opinion Score, estimator, for predicting a multimedia session MOS, wherein the multimedia comprises a video and an audio, wherein video quality is represented by a list of per time unit scores of a video quality, an initial buffering event and rebuffering events in the video, and wherein audio quality is represented by a list of per time unit scores of audio quality, the method comprising:
generating video features from the list of per time unit scores of the video quality;
generating audio features from the list of per time unit scores of the audio quality;
generating buffering features from the initial buffering event and rebuffering events in the video; and
estimating a multimedia session MOS from the generated video features, generated audio features and generated buffering features by using machine learning technique.

2. The method according to claim 1, wherein the video features comprise a feature being a first percentile of the per unit time scores of the video quality.

3. The method according to claim 1, wherein the video features comprise a feature being a fifth percentile of the per unit time scores of the video quality.

4. The method according to claim 1, wherein the video features comprise a feature being a fifteenth percentile of the per unit time scores of the video quality.

5. The method according to claim 1, wherein the step of estimating is based on a random forest based model.

6. The method according to claim 1, wherein the buffering features comprise a feature being total buffering time.

7. The method according to claim 1, wherein the buffering features comprise a feature being number of rebuffering events.

8. The method according to claim 1, wherein the buffering features comprise a feature being percentage of buffering time divided by video time.

9. The method according to claim 1, wherein the buffering features comprise a feature being number of rebuffering events per video length.

10. The method according to claim 1, wherein the buffering features comprise a feature being last seen rebuffering from the end of the video.

11. A MOS, Mean Opinion Score, estimator for predicting a multimedia session MOS, wherein the multimedia comprises a video and an audio, wherein video quality is represented by a list of per time unit scores of a video quality and an initial buffering event and rebuffering events in the video and wherein audio quality is represented by a list of per time unit scores of audio quality, the MOS estimator comprising processing means and a memory comprising instructions which, when executed by the processing means, causes the MOS estimator to:
generate video features from the input list of per time unit scores of the video quality;
generate audio features from the input list of per time unit scores of the audio quality;
generate buffering features from the initial buffering event and rebuffering events in the video; and
estimate a multimedia session MOS from the generated video features, generated audio features and generated buffering features by using machine learning technique.

12. The MOS estimator according to claim 11, wherein the video features comprise a feature being a first percentile of the per unit time scores of the video quality.

13. The MOS estimator according to claim 11, wherein the video features comprise a feature being a fifth percentile of the per unit time scores of the video quality.

14. The MOS estimator according to claim 11, wherein the video features comprise a feature being a fifteenth percentile of the per unit time scores of the video quality.

15. The MOS estimator according to claim 11, wherein the instructions to estimate comprise instructions which, when executed by the processing means, causes the MOS estimator to estimate using a random forest based model.

16. The MOS estimator according to claim 11, wherein the buffering features comprise a feature being total buffering time.

17. The MOS estimator according to claim 11, wherein the buffering features comprise a feature being number of rebuffering events.

18. The MOS estimator according to claim 11, wherein the buffering features comprise a feature being percentage of buffering time divided by video time.

19. The MOS estimator according to claim 11, wherein the buffering features comprise a feature being number of rebuffering events per video length.

20. The MOS estimator according to claim 11, wherein the buffering features comprise a feature being last seen rebuffering from the end of the video.

21. A non-transitory computer-readable storage medium comprising a computer program product including instructions to cause at least one processor to:
generate video features from the input list of per time unit scores of the video quality;
generate audio features from the input list of per time unit scores of the audio quality;
generate buffering features from the initial buffering event and rebuffering events in the video; and
estimate a multimedia session MOS, Mean Opinion Score, from the generated video features, generated audio features and generated buffering features by using machine learning technique.

* * * * *

UNITED STATES PATENT AND TRADEMARK OFFICE
CERTIFICATE OF CORRECTION

| | |
|---|---|
| PATENT NO. | : 11,122,329 B2 |
| APPLICATION NO. | : 16/078201 |
| DATED | : September 14, 2021 |
| INVENTOR(S) | : Fu et al. |

It is certified that error appears in the above-identified patent and that said Letters Patent is hereby corrected as shown below:

On the Title Page

On Page 2, item (56), under "OTHER PUBLICATIONS", in Column 2, Line 12, delete "non-instrusive" and insert -- non-intrusive --, therefor.

In the Drawings

In Fig. 3, Sheet 3 of 6, delete " 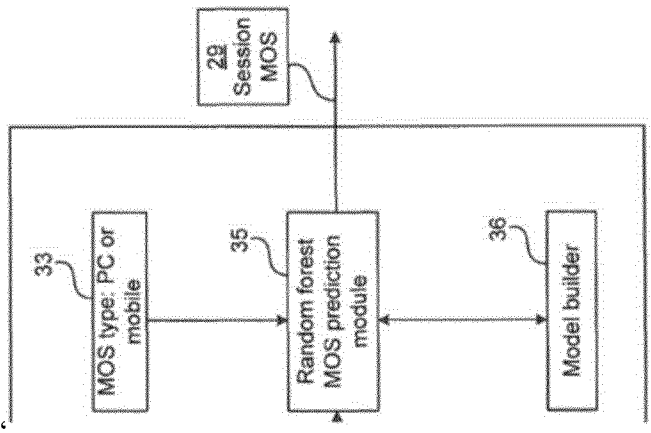 " and insert

Signed and Sealed this
Sixteenth Day of August, 2022

Katherine Kelly Vidal
*Director of the United States Patent and Trademark Office*

CERTIFICATE OF CORRECTION (continued)
U.S. Pat. No. 11,122,329 B2

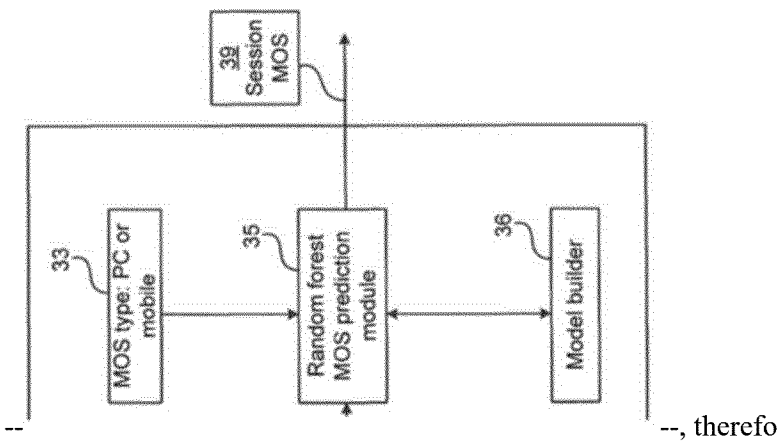

-- ... --, therefor.

In the Specification

In Column 2, Line 5, delete "issued the" and insert -- issued in the --, therefor.

In Column 2, Line 11, delete "RTP (Real Time Protocol) protocol," and insert -- RTP (Real Time Protocol), --, therefor.

In Column 4, Line 21, delete "MOS estimator of FIG. 2;" and insert -- MOS estimator of FIG. 6; --, therefor.

In Column 4, Line 61, delete "FIG. 1 relate" and insert -- FIG. 1 relates --, therefor.

In Column 5, Lines 17-18, delete "[[0, 2], [10, 1]], in where" and insert -- [[0, 2], [10, 1]], where --, therefor.

In Column 5, Line 37, delete "are there three gaps" and insert -- are three gaps --, therefor.

In Column 6, Line 13, delete "score" and insert -- score. --, therefor.

In Column 6, Line 48, delete "[50, 1]]" and insert -- [50, 1]]. --, therefor.

In Column 6, Line 51, delete "(With" and insert -- (with --, therefor.

In Column 6, Line 56, delete "video" and insert -- video. --, therefor.

In Column 7, Line 15, delete "of a" and insert -- of as a --, therefor.

In Column 7, Line 31, delete "one more" and insert -- one or more --, therefor.

In Column 7, Line 54, delete "parses" and insert -- passes --, therefor.

CERTIFICATE OF CORRECTION (continued)
U.S. Pat. No. 11,122,329 B2

In Column 8, Line 48, delete "of to streaming:" and insert -- of streaming: --, therefor.

In Column 10, Line 58, delete "the to depicted" and insert -- the depicted --, therefor.